April 5, 1927.　　　　F. W. BROWN　　　　1,623,656
WHEEL FOR VEHICLES
Filed Feb. 9, 1921　　　　2 Sheets-Sheet 1

WITNESSES　　　　　　　　　　　　　　　INVENTOR

April 5, 1927.
F. W. BROWN
1,623,656
WHEEL FOR VEHICLES
Filed Feb. 9, 1921
2 Sheets-Sheet 2
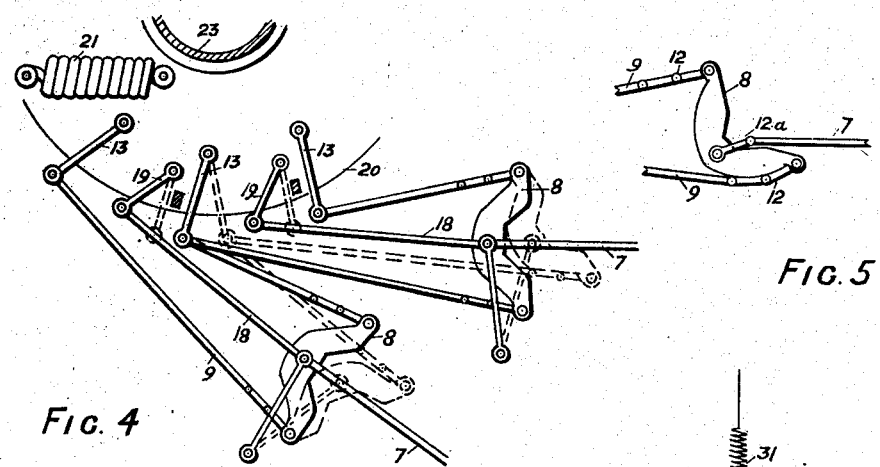
FIG. 4
FIG. 5
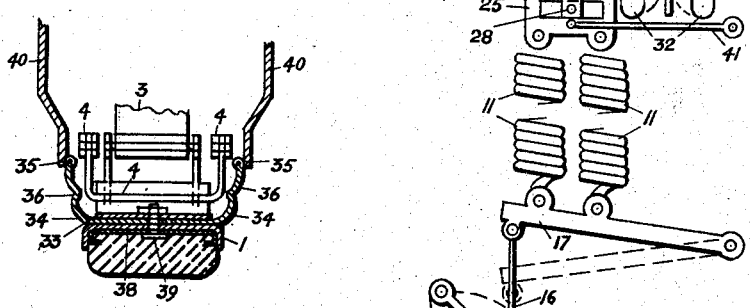
FIG. 7
FIG. 6
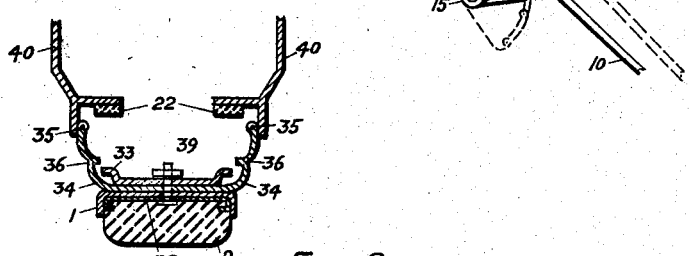
FIG. 8
WITNESSES
George William Burgon Lane.
William John Isaac
INVENTOR
Frederick William Brown Patented Apr. 5, 1927.

1,623,656

UNITED STATES PATENT OFFICE.

FREDERICK WILLIAM BROWN, OF YORK, ENGLAND.

WHEEL FOR VEHICLES.

Application filed February 9, 1921, Serial No. 443,653, and in Great Britain February 11, 1920.

This invention relates to spring wheels for motor cars and other wheeled vehicles, and has for its object to reduce the vibration caused by the unevenness of the roads, or in other words to effect the same purpose as pneumatic tyres.

The spring wheels constructed in accordance with my invention each have a rim formed in segments and hinged together. Any suitable number of segments may be used according to the diameter of the wheel but ten or twelve would be found suitable for a wheel of three feet diameter. The segments are provided with treads of rubber or other suitable substance to take the wear, and the segments are supported on crank levers pivoted between two sheet metal discs which form the outer sides of the wheel, the inner ends of the crank levers are connected to springs placed in the interior of the wheel. Between the adjoining ends of the segments there are short spaces and when the rim is pressed inwards in passing over a stone the segments close together at these parts so that the rim can contract and expand circumferentially.

One of the objects of my invention is that the spring wheel may run evenly, and for this purpose I use an equalizing mechanism to connect the crank levers to the springs so that as the wheel revolves, although the weight is carried by a single crank lever and a pair of crank levers alternately, yet the support given by the crank levers and their springs is similar in both cases.

Another part of my invention is the provision of springs stretched by pivoted levers which gradually gain leverage over the springs so that their resistance as they are stretched does not increase so rapidly as would be the case with ordinary springs, thus they are much more flexible. The springs may be held normally in sufficient tension by metal stops placed between their coils so as to support the weight of the car without being stretched further. But when the wheel passes over a stone on the road the segment affected is pushed upwards until it has passed clear of the stone. Means are provided for regulating the strength of the springs to suit varying loads on the car and also to make them more flexible if desirable. Strong supplementary springs are also provided which only come into use towards the end of the radial movement of the segments. Thus the ordinary springs are made more flexible because the supplementary springs support any extra weight on the wheels, such for instance as would be caused by centrifugal force when the car turned a corner. Means are also provided for lubricating the various pivots in the wheel by small detachable oilers held in position by spring clips.

In order that my invention may be better understood I shall hereafter refer to the drawings accompanying this specification whereon like reference numerals denote like parts in the different figures.

On Sheet 1, Fig. 1 is a partial side elevation of the spring wheel with the outer side removed.

On Sheet 2, Fig. 4 is a partial side elevation of the links and equalizing levers.

Fig. 5 is a side elevation of an equalizing lever of an alternative form.

Fig. 6 is a side elevation of a set of springs showing a controlling lever at the lower part and a method of regulating the strength of the springs at the upper part of the figure.

Figs. 7 and 8 are partial cross sections of the lower part of the spring wheel and tread.

Figure 1:
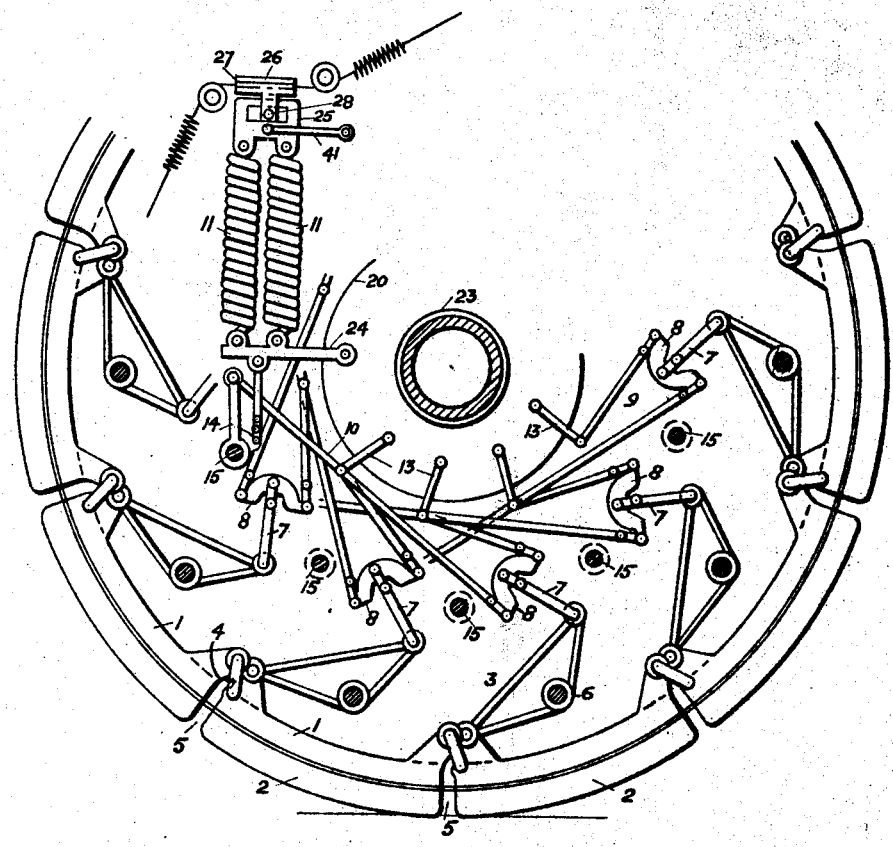

Referring to Fig. 1. The spring wheel as shown has the rim consisting of ten segments, each segment having a rubber tread block 2 fixed to it. The segments are each hinged at one end direct to the crank levers 3 and at the other end to a short U-shaped link pivoted just radially outwards of the crank lever on the adjacent segment, which link connection allows for circumferential movements in the segments so that their ends may move together or apart at the spaces 5. The crank levers are pivoted at 6 to the disc sides of the spring wheel and their inner ends are connected to the equalizing levers 8 by pivoted links 7 hinged centrally to 8. The outer ends of 8 are connected to the springs by pivoted links 9 and 10, each of the levers 8 being connected to two sets of springs. When the wheel is in the position shown in Fig. 1 one crank lever is sustaining the weight and thus two sets of springs would be in use. But when any segment of the rim is resting centrally on the road the weight would be carried by two crank levers and thus the weight is mainly on one set of springs. In this latter position when the load on the car is normal the levers 8 would remain in their original position as shown in Fig. 4 by the full lines. Thus one fourth of the weight is carried by each outer link and one half of the weight by the two links which adjoin each other. But as the load is increased, only the springs for the two adjoining links would yield and the levers 8 would pivot over in proportion to the increase of weight, thus bringing the links 7 gradually nearer together until they are checked by the inner sides of the levers 8. In this position shown by the dotted lines, each link would be about two thirds of the width of the lever 8 from its outer pivot, so that approximately two thirds of the total weight comes on to the two adjoining links and about one sixth of the weight comes on the outer links.

Figure 2:
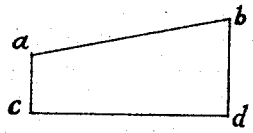
Fig. 2 is a diagram of the strength of the springs.

The links 7 and 9 may have a number of short chains hinged to them as at 12 and 12$^a$ Fig. 5 so that as the radial movement is continued the levers 8 can pivot further over without increasing the leverage. During any radial movement of the rim segments the levers 8 by pivoting over would adjust the leverage exerted on the two adjoining links so that the support given by the springs is the same for any position of the wheel. The links 9 are pivoted to a series of short guide levers 13 hinged to the frame of the wheel, two adjoining links being connected to each guide lever. From these levers single pivoted links 10 connect with the levers which control the springs. One such lever being shown at 14, Fig. 6, a short link and chain 16, Fig. 6, connects the springs to a quadrant fixed to the link 14 and working on the same centre 15. When the lever 14 is pulled round by the link 10 it moves the link to a greater distance from the centre pivot 15 and thus gradually obtains more leverage over the springs. The lever 14 is moving through the arc shown in Fig. 6 but not further than shown (where the link 10 would be tangential to the arc) enables the spring to give a resistance curve as shown in Fig. 2, $a$ to $b$, the line $ca$ showing the resistance at the beginning of the movement and the line $db$ showing that at the end of the movement. Thus the resistance increases regularly throughout the movement.

Figure 3:
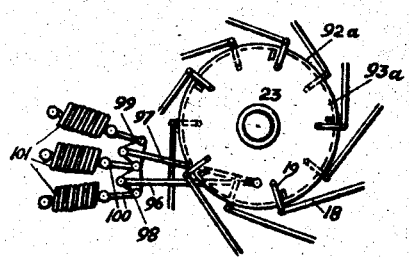
Fig. 3 is a side elevation of the drums used in the centre of the wheel in connection with the equalizing levers and springs.

There are links 18 provided as in Fig. 4 connecting the centre pivots of the levers 8 to the guide levers 19 which are hinged to the disc drum 20 which is pivoted on the central axle tube 23. A strong spring 21 (which may be held in tension by a helical stop) is connected to the frame of the wheel and holds the drum 20 in its normal position, and only comes into use when the crank levers stretch the ordinary springs beyond a certain limit, then the links 18 pull the levers 19 further and stretch the spring 21 which is supplementary to the ordinary springs and both acting together give an increased strength. When the wheel has to support a weight much above the normal load it would sink until the supplementary springs come into use. An alternative arrangement of supplementary springs is shown in Fig. 3. The links 18 and levers 19 are connected alternately to two drums 92$^a$ and 93$^a$. Links 96 and 97 connect the drums to two equalizing levers 98 and 99 which are hinged together, and hinged to the ends of three links 100 which connect to springs 101. This arrangement having equalizing levers would enable the levers to run evenly on the supplementary springs.

I also fix circumferential rings 22 Fig. 8, of rubber, to the curved sides of the frame of the wheel 40 to check the radial movement of the segments, the interior bearing surface of the segments towards the rings 22 being made of a circular curve concentric with the rings so that the wheel could run evenly with the segments resting on the rings 22.

The sides of the levers 8, Fig. 5 are shaped so that when they come in contact with the chains 12 at ends of the links 9 they alter the leverage exerted. The link 7 is hinged at 12$^a$ and bends when it comes in contact with the inner surfaces of the lever 8 which causes the leverage to be altered where required.

If the rim of the wheel is constructed with ten segments there would be ten sets of springs, viz: five sets on each side of the wheel, the links and equalizing levers occupying the central plane of the wheel, the springs being on the outer sides. Only one set of springs is shown in Fig. 1 the other sets of springs being omitted to enable the equalizing levers to be more clearly shown, pivots are shown at 15 and thus give the relative positions of the other springs which are arranged alternately on opposite sides of the wheel.

The rim segments consist of an inner part 33 and an outer part 1 and are provided with an outer cover 34 Figs. 7 and 8, of canvas and rubber to keep out dirt. This cover passes between 33 and 1 and its upper edges are held to the disc sides of the wheel by extensible spring wires 35 running around the circumference, so as to be detachable. There are ribs 36 midway in the sides of the cover to stiffen it and divide it into two parts which can bulge outwards in two curves when the tread of the wheel moves in a radial direction.

The tread blocks 2 Fig. 8 are of rubber or other suitable material. Each block is vulcanized to a metal base plate 38 which has dovetailed grooves formed in it to give security. The base plates have projecting bolts 39 at each end which pass through holes in the rim segment and are secured at the outer side by cotter pins passing through holes in these bolts. The blocks 2 are thus detachable for renewals. The blocks may have a core of softer rubber and an outer tread of harder rubber.

The springs used in my wheel are kept normally in sufficient tension to support the weights of the car without stretching further.

If two of my spring wheels are used as a twin wheel I arrange the spaces 5 of one wheel opposite the centres of the segments in the other wheel.

I declare that what I claim is:—

1. A spring wheel for motor cars and other wheeled vehicles having a contractible rim constructed in segments which are hinged to and supported on a series of crank levers pivoting within the wheel, their inner arms being connected to springs by equalizing levers and links so that equal pressure would cause equal radial movement at any part of the tread.

2. A spring wheel having a contractible rim of segments hinged to a series of crank levers pivoted in the wheel and connected to equalizing levers and links placed in the wheel and connected to springs placed towards the outer sides of the wheel.

3. A spring wheel having a contractible rim hinged to a series of crank levers and connected to equalizing levers and links place in the wheel and connected to springs placed alternately at opposite sides of the wheel.

4. In a spring wheel having a contractible rim hinged to a series of crank levers which are connected to equalizing levers and links, the combination therewith of pivoted levers interposed between the links and the springs.

5. In a spring wheel having a contractible rim hinged to a series of crank levers pivoted in the wheel, their inner arms connected by equalizing levers and links to springs, the combination therewith of supplementary springs.

6. In a spring wheel the combination of a contractible rim of segments having rubber treads, a series of crank levers hinged to and supporting the rim and connected to equalizing levers and links and to springs.

7. In a spring wheel the combination of a contractible rim of segments having rubber treads, a series of crank levers hinged to and supporting the rim and connected by equalizing levers and links to springs held in tension.

8. In a spring wheel the combination of a contractible rim of segments having rubber treads, a series of crank levers hinged to and supporting the rim, flexible side covers between the rim and the wheel, rubber stops within the wheel, and equalizing levers and links connecting the said crank levers to springs placed in the wheel.

9. In a spring wheel, the combination of a contractible rim of segments having rubber treads a series of crank levers hinged to and supporting the rim, rubber stops between the rim and the wheel, links and equalizing levers connecting the said crank levers to springs, and pivoted levers interposed between the links and the springs.

FREDERICK WILLIAM BROWN.